July 23, 1963    G. A. MARSH ETAL    3,098,801
APPARATUS AND METHOD FOR MEASURING
CORROSIVENESS OF AQUEOUS LIQUIDS
Filed June 30, 1959    5 Sheets-Sheet 1

INVENTORS
GLENN A. MARSH
BY EDWARD SCHASCHL
*Edward H. Fang*
ATTORNEY

July 23, 1963  G. A. MARSH ETAL  3,098,801
APPARATUS AND METHOD FOR MEASURING
CORROSIVENESS OF AQUEOUS LIQUIDS
Filed June 30, 1959   5 Sheets-Sheet 2

INVENTORS
GLENN A. MARSH
BY EDWARD SCHASCHL
ATTORNEY

INVENTORS
GLENN A. MARSH
BY EDWARD SCHASCHL
ATTORNEY

INVENTORS
GLENN A. MARSH
BY EDWARD SCHASCHL
ATTORNEY

July 23, 1963

G. A. MARSH ETAL 3,098,801

APPARATUS AND METHOD FOR MEASURING
CORROSIVENESS OF AQUEOUS LIQUIDS

Filed June 30, 1959

INVENTORS
GLENN A. MARSH
BY EDWARD SCHASCHL

Edward H Long

ATTORNEY

United States Patent Office 3,098,801
Patented July 23, 1963

3,098,801
APPARATUS AND METHOD FOR MEASURING CORROSIVENESS OF AQUEOUS LIQUIDS
Glenn A. Marsh and Edward Schaschl, Crystal Lake, Ill., assignors to The Pure Oil Company, Chicago, Ill., a corporation of Ohio
Filed June 30, 1959, Ser. No. 824,017
19 Claims. (Cl. 204—1)

This invention relates to an apparatus and method for measuring the corrosiveness of aqueous liquids. More particularly, the invention relates to an apparatus and method whereby a determination of anodic and cathodic areas of corrosion can be made, thereby furthering experimental work and comparisons of corrosive environments.

One of the best practical methods of determine the extent of corrosion in operating equipment is by direct observation of the influence of corrosion under actual service conditions. In this method, the heterogeneity of the corrosive environment is taken into consideration. Various methods have been devised for the purpose, primarily for steel, including the placement of a metallic specimen in the corrosive environment on a simple type of hanger, and the more complicated procedure of employing a specimen holder to support a number of test specimens in insulated relationship and to exclude galvanic contacts. These methods require tedious weighing and re-weighing of the test specimens and have the additional disadvantage of not being applicable to performing corrosion tests wherein it is desired to separate anodic and cathodic areas of the corroding metal.

It is frequently desirable in the study of corrosion and corrosion rates to measure the effects of various inhibitors or other environmental factors which influence the rate or extent of corrosion. However, it has not been entirely possible to establish distinct areas of anodic and cathodic corrosion as exist in the corrosion of a metal surface in the presence of moisture.

It has been established that such corrosion is an electrolytic process in which the metal surface dissolves in certain areas called the anodes, at which electrons are produced, and the cathodes are adjacent areas of the metal surface at which electrons are consumed. The anodic and cathodic areas are the seats of the following reactions:

(Anodic) $Fe \rightarrow Fe^{++} + 2e^-$
(Cathodic) $O_2 + 2H_2O + 4e^- \rightarrow 4OH^-$ These small associated areas of reaction are driven by some inhomogeneity on the surface of the metal, or some inhomogeneity in the medium surrounding same. The reaction rates are influenced by the size and distribution of local anodic and cathodic areas, and the chemical and electrical properties of the surrounding environment.

This invention is based on the discovery that the corrosion rate of a given electroyltic environment can be determined by allowing a first test specimen of a metal to corrode therein for a predetermined period of time, placing a second uncorroded specimen of the same metal in the environment, and measuring the current flow between the specimens under conditions of zero external resistance. It has been found that for small specimen spacings, i.e., short distances between the corroded and uncorroded specimens, the current is practically linear with distance. An accurate determination of the corrosion rate for closely associated specimens, simulating superimposed anodic and cathodic areas, can be made by extra polation.

Aqueous corrosion is known to be associated with anodic and cathodic areas on a corroding metal surface. By establishing artificial anodic and cathodic areas at known distances apart and measuring the current density, the results can be extrapolated to zero distance to determine the corrosion rate caused by the environment. A corroded specimen with a film or layer of corrosion products is the anode in such an artificial corrosion cell, and an uncorroded specimen, because it has less or no film or scale, becomes cathodic with respect to the corroded specimen.

It becomes, therefore, a primary object of this invention to provide a process for determining the corrosiveness of aqueous environments, especially those having a pH of 5 or above.

Another object of the invention is to provide a process for determining the corrosiveness of aqueous environments by obtaining a current flow between artificial cathodes and anodes. If desired, the current can be obtained at known spacings of anode and cathode and extrapolated back to the current at zero spacing.

Another object of the invention is to provide a method and apparatus for determining the corrosiveness of an environment by establishing a corroded metallic area in conjunction with a non-corroded metallic area at predetermined spacing and determining the anodic and cathodic corrosion relationships therefrom.

These and other objects of this invention will be described or become apparent as the description proceeds.

The invention will be demonstrated by a number of experiments and by reference to the drawings in which.

Figure 1:
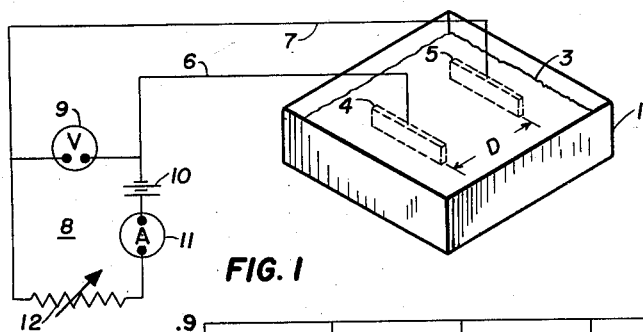
FIGURE 1 is a diagram showing in simplified form one form of apparatus and electrical circuit of this invention.

Throughout the drawings, wherever applicable, the same numerical designation is used with the same part or parts of the apparatus. The invention relates primarily to the method and apparatus wherein two or more ferrous test specimens are exposed to a corrosive environment so as to form a layer of corrosion products on the exposed surface of one specimen, a next test specimen of equal area to the first test specimen, or of known area in relation to the area of the first test specimen, and of substantially the same composition, is exposed to the corrosive environment under the same conditions, and the current flow that would occur between the originally exposed and the newly exposed specimens is determined. The invention also relates to the apparatus by which the foregoing type of measurements can be made, which apparatus comprises broadly a base member supporting two or more test specimens in a corrosive atmosphere, and means for directly or remotely removing a cover member from one or more of the test specimens, with or without electrical means for measuring the cathodic and anodic corrosion rates so established. Throughout this specification where reference is made to a corrosion-test probe, it is understood to mean the device including the base element, test specimens and movable cover means. Where reference is made to a corrosion-test element, it is understood to mean the particular combination of test specimens and movable cover means. The invention is best explained by reference to certain experiments, and to the drawings followed by an explanation of various modifications thereon.

EXAMPLE I

A vat 1, containing 3% aqueous sodium chloride 3, was set up to hold test specimens 4 and 5 immersed therein at a fixed parallel distance of 3 inches apart. These specimens were steel strips measuring 2½" x ½" x 1/16". A protective coating of waterproof tape was applied to all surfaces of test specimen 5. Solution 3 was aerated but not agitated. Electrical wires 6 and 7 were attached and connected to corrosion-measuring circuit 8, comprising vacuum-tube voltmeter 9, battery 10, ammeter 11 and variable resistance 12 arranged to constitute a zero-resistance ammeter circuit as will be explained. The device was left standing and after 2 days a rust layer had formed on the exposed specimen 4. At this time the protective coating of tape was removed from specimen 5 and a zero-resistance current reading of 700 μa. was recorded by circuit 8. The foregoing steps were repeated exactly using new specimens, with the exception that they were placed only ½ inch apart. On exposure of the protected test specimen to the sodium chloride solution, a current reading of 850 μa. was obtained.

Figure 2:
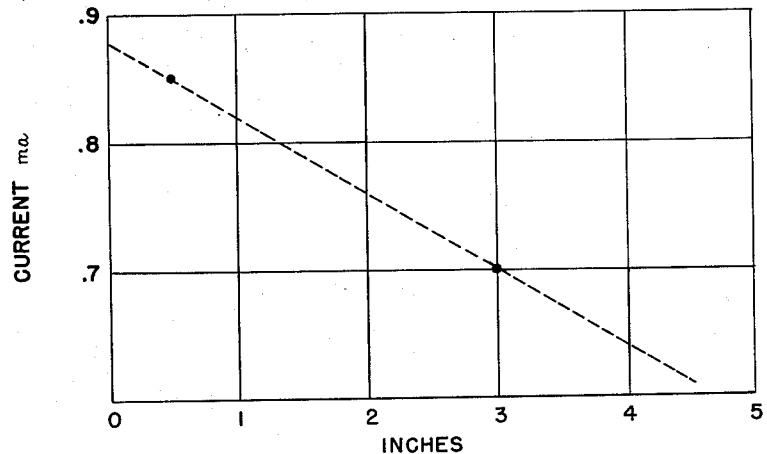
FIGURE 2 is a graph of the results obtained using test specimens at known distances from each other, wherein the distances are shown as abscissas and the current readings as ordinates.

The results are shown in the graph in FIGURE 2. From this it is apparent that a close approximation of local cell current can be obtained by extrapolating back to zero distance between specimens.

EXAMPLE II

In order to determine whether or not the current-specimen distance curve was exactly linear, another series of experiments was conducted. Using the apparatus shown in FIGURE 1, two steel specimens, each having a total surface area of 0.1 sq. ft., were pre-rusted by alternately hanging them in a gaseous hydrogen chloride environment and dipping them in aerated 3% sodium chloride solution. The zero-resistance current flow between one of these specimens and a similar uncorroded specimen was then determined at different spacings (D) in an aerated 1% sodium chloride solution. This procedure then was repeated using the other pre-rusted specimen as an anode to determine the reproducibility of the results. Results were as follows:

*Current, M (Milliamperes)*

| Distance (D) (inches) | Specimen 4 | Specimen 5 |
|---|---|---|
| 0.5 | 3.75 | 3.75 |
| 1 | 3.6 | 3.6 |
| 2 | 3.5 | 3.5 |
| 4 | 3.0 | 3.0 |
| 6 | 2.8 | 3.0 |
| 8 | 2.7 | 3.0 |

Figure 3:
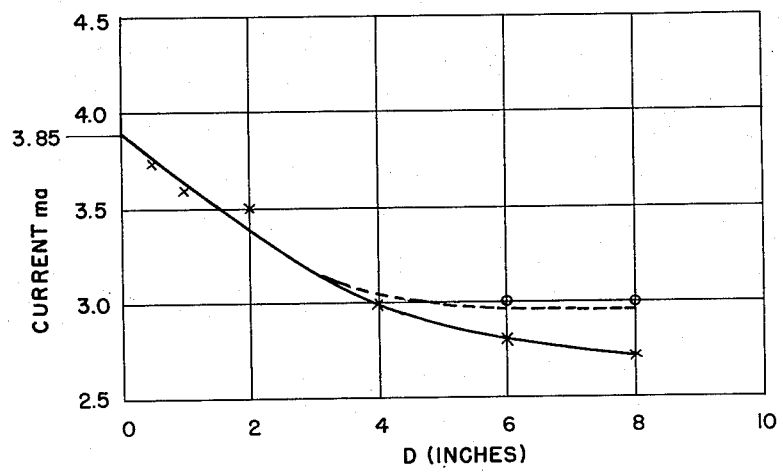
FIGURE 3 is an another graph of the results obtained using various distances between test specimens, wherein the distances are shown as abscissas and the current readings as ordinates.

These data are plotted in the curves of FIGURE 3. The extrapolated current at zero distance is 3.85 ma. per 0.1 sq. ft., or 38.5 ma. per square foot, in both experiments. The corrosion rate of the anode is about 0.02 inch penetration per year.

It is apparent that the curves of FIGURE 3 are sufficiently straight at the lower specimen spacing to permit linear extrapolation to zero distance.

The process of this invention, accordingly, encompasses the steps of exposing a test specimen of a corrodible material to a corrosive aqueous environment for such time as is necessary to form a layer of typical corrosion products thereon, exposing a similar second test specimen to the environment and recording the current flow between the specimens at known distances therebetween.

The process can be carried out with the simple apparatus shown in FIGURE 1 or the embodiments shown in the remaining drawings. It is to be understood that the invention is not to be limited to the structures shown and they are given as illustrative of the broad invention.

Figure 4:
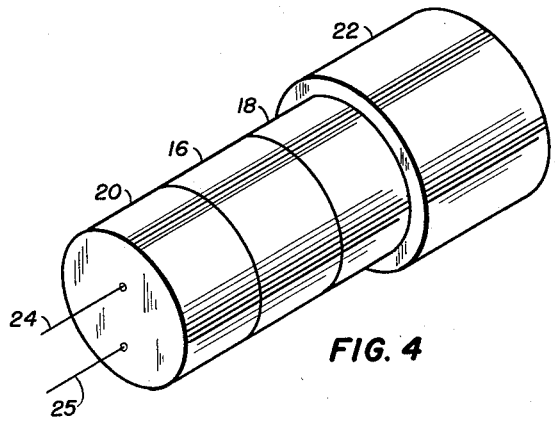
FIGURE 4 is a side perspective view of a simple form of apparatus that may be used in making corrosion measurements in accordance with the invention.
Figure 6:
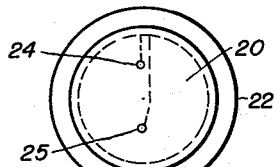
FIGURE 6 is an end view of the embodiment shown in FIGURE 4.
Figure 5:
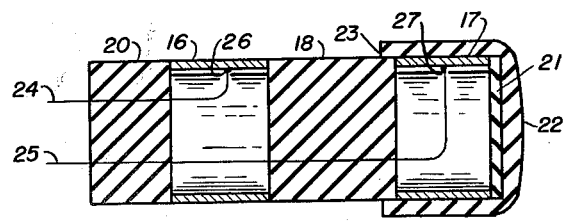
FIGURE 5 is a longitudinal cross-sectional view of the embodiment shown in FIGURE 4.

Referring to FIGURES 4, 5 and 6, a corrosion-test probe is shown comprising a cylindrical or tubular test element including corrodible metal test specimens 16 and 17 separated by insulator 18 and in turn attached to base insulator 20. Corrodible metal pieces 16 and 17 are substantially the same size or have the same exposed surface area and are of identical composition. Insulators 18 and 20 may be of any desired dimensions as long as they separate the specimens 16 and 17 a known distance and provide adequate electrical insulation without interference with the corrosion reaction. Disc 21 is provided to close the open end of specimen 17 and is attached thereto. Cover 22 is a simplified form of cover adapted to fit over element or specimen 17 and protect same from the corrosive atmosphere. The edge 23 extends beyond the inside of test specimen 17. The hollow or cylindrical form of these elements and the solid form of insulators 18 and 20 facilitates the attachment and support of leads 24 and 25 to each element for connection to corrosion-measuring circuit 8 (shown in FIGURE 1). Leads 24 and 25 are attached to the test specimens by means 26 and 27 which may be solder points or spot welds.

In operation, the assembly comprising test specimens 16 and 17 with cover 22 in place is brought into contact with a corrosive aqueous environment, and maintained therein until typical corrosion products have been formed on exposed test element 16. At this time, cover member 22 is removed to expose test element 17 and the corrosion process is allowed to proceed while cell current is being measured by zero-resistance ammeter 8. Since test specimen 17 has no scale, it becomes cathodic with respect to specimen 16 because its surface is more accessible than that of specimen 16 to the reactants responsible for the cathodic reaction. Thus, zero-resistance ammeter assembly 8 (FIGURE 1) measures the cell current that flows between specimens 16 and 17, that is, through leads 24 and 25. This cell current is a measure of the corrosion which is occurring at anode 16 due to the presence of the electrolyte of the aqueous medium and cathode 17.

Figure 7:
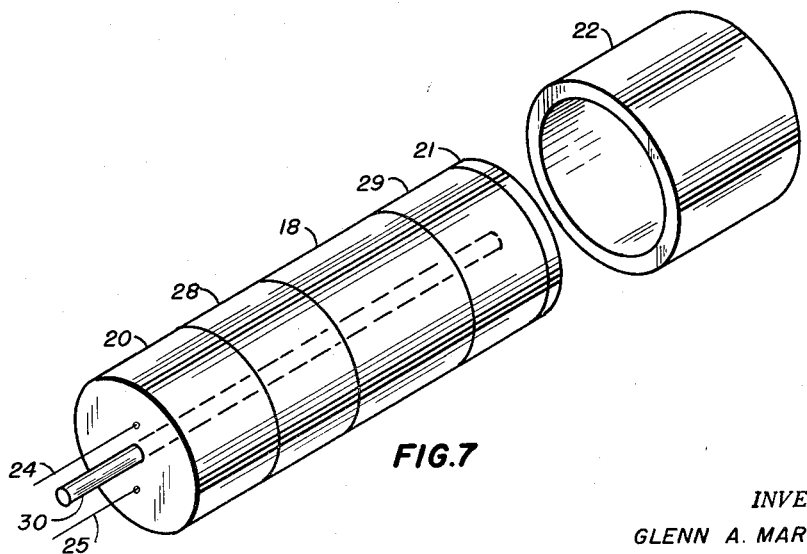
FIGURE 7 is a side perspective view of another form of apparatus, using solid test elements, with the cover member removed.

In FIGURE 7 another form of test probe is shown wherein solid test specimens are used. In this embodiment, base insulator 20 is attached to specimen 28, and insulator 18 serves as the spacer of known dimensions and to support specimen 29. Insulating disc 21 covers the end surface of specimen 29. Cover 22 is shown in detached position. Conduit 30 passes through the assembly from end to end. Conduit 30 may function as a means for introducing leads 24 and 25 through the assembly, and compressed air or a rod may be passed into the conduit to remove cover 22 where base member 20 is attached through a wall confining the corrosive environment.

Figure 8:
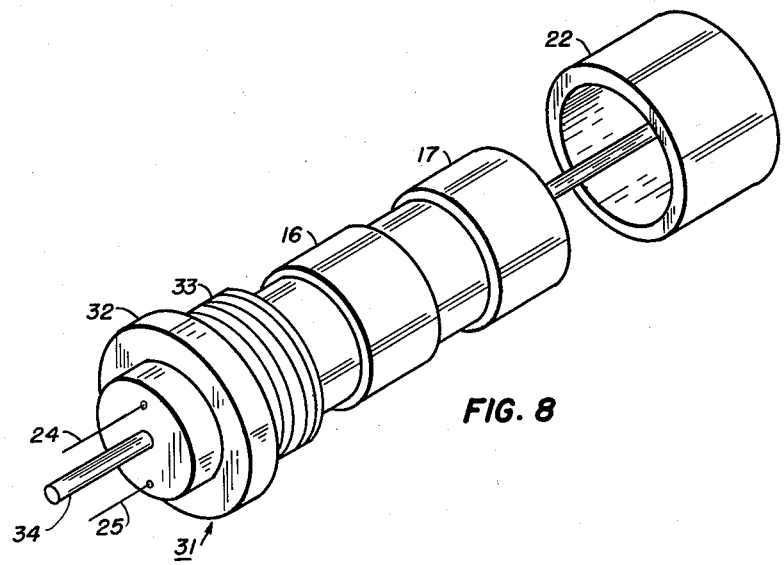
FIGURE 8 is a side perspective view of another form of apparatus, using a solid base member and cylindrical foil test elements, wherein the cover member for one of the test elements is actuated by a rod and same is shown in uncovered position.
Figure 9:
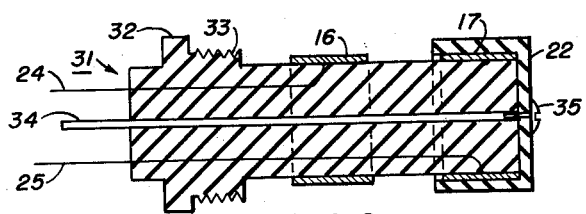
FIGURE 9 is a longitudinal cross-sectional view of the embodiment shown in FIGURE 8 with the cover member in place over one of the specimens.

Referring to FIGURES 8 and 9, test specimens 16 and 17 and cover member 22 are shown in a different arrangement. Base member 31 has flange 32 and threaded portion 33 for the purpose of inserting and sealing the device through a threaded aperture in a vessel wall. Specimens 16 and 17 fit concentrically around base 31 at a known spaced distance from each other. Rod 34 extends centrally through base 31 in slideable sealed relationship, and attaches to cover 22 by means of screw 35. Leads 24 and 25 attach as before-described. FIGURE 9 shows the position of rod 34 and cover 22 at the start of an experiment, and in FIGURE 8 their positions are shown during the taking of anodic-cathodic current-flow readings.

Figure 10:
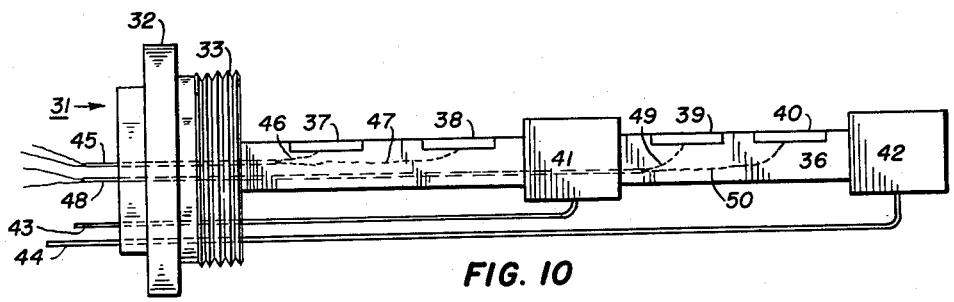
FIGURE 10 is a side elevation view of another form of apparatus employing a plurality of test specimens and dual-cover means slideably mounted thereover.

Referring to FIGURE 10, base 31 has an elongated insulating body 36, extending therefrom in which test specimens 37, 38, 39 and 40 are so imbedded that the top surfaces are in the plane of the top surface of body 36. Two cover means, 41 and 42, are shown with actuating rods 43 and 44, respectively. Cover means 41 and 42 are slideably mounted on body 36 so that when they are in position over the test specimens, the latter are sealed from the corrosive environment. Cover means 41 and 42 have apertures through which body 36 is inserted. Rods 43 and 44 are attached to the bottoms of covers 41 and 42 and are slideably mounted in base 31. Conduit 45 supports leads 46 and 47 connected to specimens 37 and 38. Conduit 48 supports leads 49 and 50 connected to specimens 39 and 40, respectively. Specimens 37, 38, 39 and 40 are imbedded in body 36 at known distances from each other.

The device shown in FIGURE 10 can be fabricated in different forms to facilitate several different modes of operation. The distances between all of the specimens may be the same. The apparatus is brought into contact with the corrosive environment with cover 41 over specimen 38 and cover 42 over specimen 40. After a given interval of exposure sufficient to allow the formation of scale on the exposed specimens 37 and 39, cover members 41 and 42 are moved to the positions shown and the device is used to make a duplicate determination of anodic and cathodic corrosion currents. Also, specimens 37 and 38 may be one type of metallic material of construction, while specimens 39 and 40 are made of different materials so that the device can be used to make two independent tests at the same or different specimen spacing. At the same time, measurements may be made of the current flow between specimens 37 and 40, and also specimens 38 and 39.

The apparatus of FIGURE 10 may be used to make several determinations representing different specimen spacings. Thus, in one embodiment, specimens 37 and 38 may be set at a distance of 1 inch apart while specimens 39 and 40 are 2 inches apart and a space of 3 inches is left between specimens 38 and 39. If the specimens are all the same materials of construction, measurements can be made between specimens 37 and 38, between 39 and 40, between 38 and 39, and between 37 and 40, to make several determinations at different specimen spacings.

Figure 11:
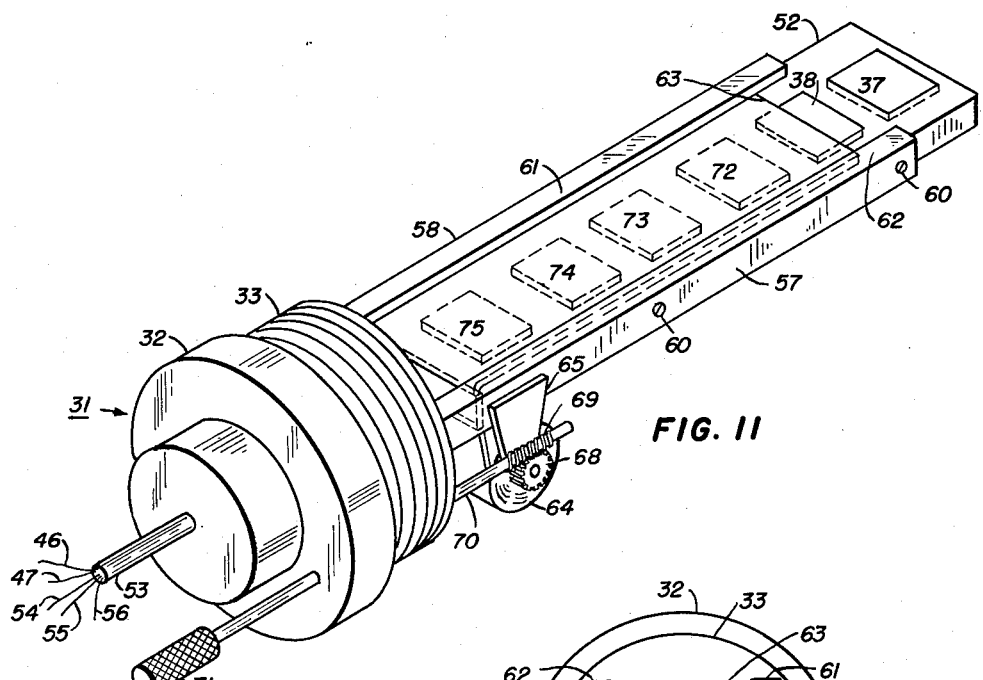
FIGURE 11 is a side perspective view of still another form of apparatus showing a plurality of test specimens and a continuously movable cover means wherein a number of different types of corrosion test measurements can be made.
Figure 12:
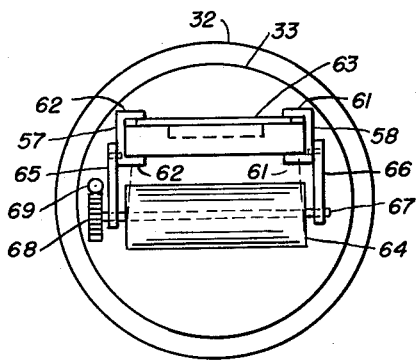
FIGURE 12 is an end view of the embodiment shown in FIGURE 11.

IN FIGURES 11 and 12 an apparatus is shown whereby continuous, non-corroded, specimen surfaces can be exposed at increasing distances from the corroded specimen in making the anodic-cathodic current measurements. Base 31, having flange 32 and threads 33, carries body member 52 in which corroded specimen 37 is imbedded. At spaced points along body 52 are located a plurality of additional specimens, the first in the series being indicated at 38. Each has an appropriate lead wire attached in the manner of wire 46 which passes back through body 52 and base 31 to form conduit 53. Other lead wires 54, 55, and 56 are shown coming from conduit 53. Body 52 has guide means 57 and 58 attached to the sides thereof as by means of screws 60. Guide means 57 and 58 are U-shaped in cross-section and have inwardly-extending edges 61 and 62 which extend over the top and bottom of body 52. Cover means 63, comprising a flexible tape, is held in place between top edges 61 and 62; one end of cover 63 is shown as it begins to expose specimen 38. The other end of tape 63 is attached to and rolls upon roller 64 supported by brackets 65 and 66, which are attached to guide means 57 and 58. Roller 64 is supported by shaft 67 to which is attached helical spur gear 68 engaging helical pinion gear 69 on shaft 70, serving as a means for rotating the roller. Shaft 70 extends in rotatable and sealed relationship through base 31 and has knurled knob 71 at the other end for easy control. Other specimens, protected from the corrosive environment, are shown as 72, 73, 74 and 75 by means of the dotted lines. These specimens may be set within body 37 at the same or different known distances from each other.

In operation, specimen 37 is first exposed and corroded in the environment. After a specified time, knob 71 is turned to move roller 64 and wind up sufficient tape to uncover specimen 38, and cathodic-anodic measurements are taken. Then the next specimen 72 is exposed and a double set of readings is taken from 72—37 and from 72—38. On exposure of specimen 73, the following combinations are made possible: 73—72, 73—38 and 73—37. With specimen 74 exposed, readings are taken from specimens 74—73, 74—72, 74—38 and 74—37, and with specimen 75 next exposed, combination readings are taken from specimens 75—74, 75—73, 75—72, 75—38 and 75—37. Each reading is at a different known spacing between the specimens. By plotting the results and extrapolating to zero distance, an estimation is made of the local cell corrosion rate.

Figure 13:
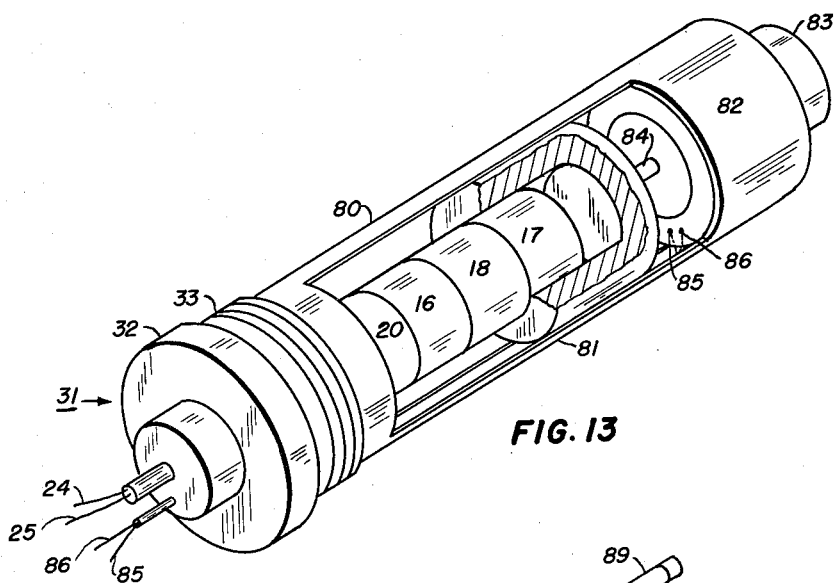
FIGURE 13 is a side perspective view in partial cross-section of another form of apparatus employing either compressed air or electromagnetic means of moving the cover means from one test specimen.

FIGURE 13 is an embodiment relating back to FIGURES 4, 5, 6 and 7 wherein base member 31, having flange 32 and threads 33, supports parallel guide arms 80 and 81 terminating in housing 82 which contains and supports cylinder 83 operably connected to rod 84 attached to cover 22 (shown in cross-section). Insulators 20 and 18 separate specimens 16 and 17 and form a test element. In this embodiment, cylinder 83 may be a solenoid or a piston operated by compressed gas. Where cylinder 83 is a solenoid, then leads 85 and 86 serve to convey the required current thereto for its operation. A conduit can be substituted for leads 85 and 86 to operate cylinder 83 as an alternative. Actuation of the piston or solenoid serves to remove cover 22 from specimen 17 when desired. The operation and use of this device is similar to the other embodiments as previously explained. Guide arms 80 and 81 may serve as bearing surfaces for cover 22.

Figure 14:
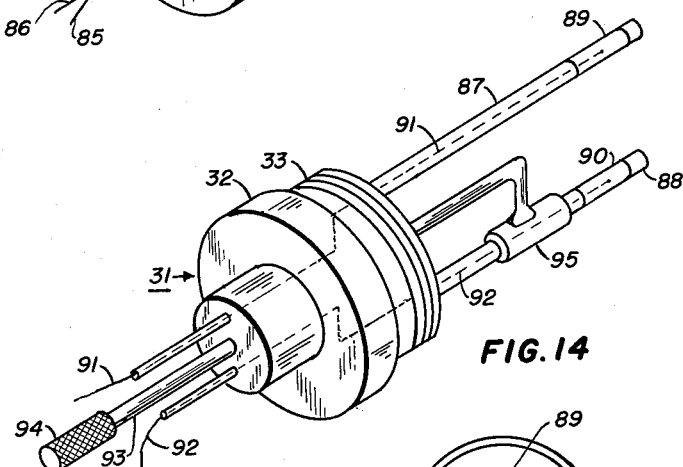
FIGURE 14 is a side perspective view of another form of apparatus wherein a cylindrical test specimen and a cooperating cylindrical cover means, which is mechanically operated, are employed.
Figure 15:
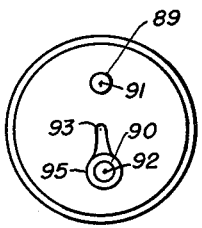
FIGURE 15 is an end view of the embodiment shown in FIGURE 14.

In the embodiment shown in FIGURES 14 and 15, base 31 supports insulators 87 and 88 having test specimens 89 and 90 near one end. Appropriate leads 91 and 92 imbedded within the insulators are shown. Rod 93, with knurled handle 94, extends in sliding sealed relationship through base 31 and attaches to cylindrical cover means 95.

From the foregoing description of this invention it is apparent that the test specimens may be identical in area with each other or they may be of different areas. Where the apparatus and method is applied to the measurement of the corrosiveness of an aqueous environment, the ratio of the respective areas can be used in the extrapolation. However, the area ratios need not be known where the invention is applied to the comparison of corrosive environments. Also, while the extrapolation method gives an estimation of corrosion rate at the local cell level, the apparatus and method can be used, in one embodiment, to measure to zero-resistance current between two test specimens a fixed distance apart to estimate the relative corrosivity of the environment.

What is claimed is:

1. The method of determining the cathodic-anodic cell current of the corrosion of a metallic material of construction in a corrosive electrolytic environment which comprises exposing at first test specimen to said environment for a time sufficient to form a layer of corrosion products on the surface thereof, exposing a second test specimen, said second test specimen having an exposed area substantially equal to the exposed area of said first test specimen to said environment at a known distance from said first test specimen whereby said first test specimen becomes anodic with respect to said second test specimen, measuring the cell current generated between said specimens, and recording same in relation to said distance, said test specimens being substantially identical test specimens of said metallic material of construction.

2. The method in accordance with claim 1 in which a plurality of test specimens at various known distances from said first test specimen are successively exposed to said environment, and successive readings of cell current are taken between the last exposed test specimen and each of the previously exposed and corroded test specimens.

3. The method in accordance with claim 1 in which said cell current is measured by a zero-resistance ammeter and said cathodic-anodic cell current is extrapolated to zero distance between the electrodes to determine the rate of corrosion as a function of said current.

4. The method of determining the relative corrosivity of a corrosive system which comprises exposing a test specimen within said corrosive system to establish a coating of corrosion products thereon, exposing another test specimen having a known area-ratio to said first test specimen to said corrosive environment at a fixed distance from said first test specimen, and measuring the zero-resistance current between said test specimens as a measure of the relative corrosivity of the corrosive system, said test specimens being substantially identical test specimens of a metallic material of construction.

5. A corrosion-test element comprising a pair of substantially identical, equal-area, test specimens of a metallic material of construction mounted a known distance from each other on an insulating means, and cover means adapted to expose each test specimen successively to the environment in which said element is located.

6. A corrosion-test element comprising a plurality of substantially identical test specimens of a metallic material of construction mounted a known distance from one another on an insulating support means, said test specimens having known area-ratios, and cover means adapted to expose each test specimen successively to the environment in which said element is located.

7. A corrosion-test element comprising a plurality of substantially identical, equal-area, test specimens of a metallic material of construction mounted a known distance from one another on an insulating support means, and cover means adapted to be removed to expose each test specimen successively to a corrosive environment.

8. A corrosion-test element comprising a base member, a first test specimen attached to said base member, an insulating member attached to said first test specimen, a second test specimen attached to said insulating member, said second test specimen having an exposable area substantially equal to the exposed area of said first test specimen, said first and second test specimens being substantially identical test specimens of a metallic material of construction, and a detachable cover means over the exposable area of said second test specimen, said cover means being adapted to expose each test specimen successively to the environment in which said element is located.

9. A corrosion-test probe comprising a tubular insulating base member, a first test specimen supported at one end of said tubular base member, a second insulating member attached to the end of said test specimen opposite said first base member, a second test specimen supported at the opposite end of said second insulating member, said test specimens having known exposed areas and being substantially identical test specimens of a metalic material of construction, and a removable cover member encompassing said second test specimen, said cover member being adapted to expose each test specimen successively to the environment in which said element is located.

10. A corrosion-test probe in accordance with claim 9 including means to remove said cover member.

11. A corrosion-test probe in accordance with claim 10 in which said means includes a rod attached to said cover member and slideably mounted through said base member.

12. A corrosion-test probe comprising, in combination, an insulating base member adapted to be inserted into a vessel wall confining a corrosive environment, an elongated insulating support member extending from one side of said base member, said support member having a plurality of substantially identical test specimens of a metallic material of construction mounted in known spacial relationship thereon, and cover means slideably mounted on said support member, said cover means extending over at least one of said test specimens, and being adapted to expose each test specimen sucessively to the environment in which said probe is located, said test specimens having substantially equal surface areas on their sides away from said support member.

13. A corrosion-test probe in accordance with claim 12 in which said cover means includes a plurality of individually slideable collar members each having an effective area of contact with said support member and test specimens to cover the entire exposable surface of said test specimens.

14. A corrosion-test probe in accordance with claim 13 in which said collar members are attached to individually operable means extending through said base member to the side opposite said support member.

15. A corrosion-test probe comprising, in combination, a base member, a support member extending from said base member, said support member having a plurality of individual test specimens mounted in known spacial relationship thereon, said test specimens being substantially identical test specimens of a metallic material of construction and having substantially identical exposable surface areas, an elongated cover means over said test specimens, said cover means being adapted to be moved so that its extended end uncovers one or more test specimens at a time, and means for moving said cover means.

16. A corrosion-test probe comprising, in combination, a base member, a support member extending from said base member, said support member having a plurality of substantially equal-area test specimens mounted in known lateral spacial relationship thereon, said test specimens being substantially identical test specimens of a metallic material of construction, an elongated flexible cover means over said test specimens, guide means attached to said support member in sliding relationship with the edge of said cover means, a spindle attached to one end of said cover means, means for rotating said spindle to expose each test specimen successively to the environment in which said probe is located, and electrical leads attached to each of said test specimens.

17. A corrosion-test probe comprising, in combination, a base member having an elongated insulating means extending from one side thereof, a pair of substantially identical test specimens of a metallic material of construction mounted a known distance from each other on said insulating means, electrical leads connected to said test specimens, a support member extending from said base member beyond the end of said insulating means, a solenoid mounted at the extended end of said support member, a fluid-tight cover member slidably mounted over one of said test specimens, and means connecting said solenoid to said cover member.

18. A corrosion-test probe having a pair of elongated insulating members extending in uniform spaced relationship from one side thereof, a test specimen of a metallic material of construction mounted on each of said insulating members, said test specimens being substantially identical test specimens having substantially equal exposed areas, a slideably mounted fluid-tight cover means on one of said insulating members adapted to protect one of said specimens from a corrosive atmosphere and be removed from protective position.

19. A corrosion-test probe in accordance with claim 18 in which said cover means encompasses said insulating means and said test specimens are embedded in said insulating means so that the top surface is flush with the surface of said insulating means.

References Cited in the file of this patent

UNITED STATES PATENTS

| | | |
|---|---|---|
| 1,807,821 | Behr | June 2, 1931 |
| 2,795,759 | Rezek | June 11, 1957 |
| 2,834,858 | Schaschl | May 13, 1958 |
| 2,878,354 | Ellison | Mar. 17, 1959 |
| 2,947,679 | Schaschl et al. | Aug. 2, 1960 |
| 3,025,458 | Eckfeldt | Mar. 13, 1962 |